United States Patent
Delahais et al.

(10) Patent No.: US 12,112,189 B2
(45) Date of Patent: Oct. 8, 2024

(54) COMPUTING ARCHITECTURE FOR VEHICLE HARDWARE AND FEATURE VIRTUALIZATION

(71) Applicant: iRider, Le Mans (FR)

(72) Inventors: Frédéric Delahais, Clamart (FR); Jean-François Simon, Arnage (FR); Thomas Rayer, Clermont-Creans (FR); Jan De Moortel, Kortrijk (BE)

(73) Assignee: IRIDER, Le Mans (FR)

( * ) Notice: Subject to any disclaimer, the term of this patent is extended or adjusted under 35 U.S.C. 154(b) by 439 days.

(21) Appl. No.: 17/625,641

(22) PCT Filed: Jul. 10, 2020

(86) PCT No.: PCT/IB2020/056526
§ 371 (c)(1),
(2) Date: Jan. 7, 2022

(87) PCT Pub. No.: WO2021/005576
PCT Pub. Date: Jan. 14, 2021

(65) Prior Publication Data
US 2022/0365804 A1    Nov. 17, 2022

Related U.S. Application Data

(60) Provisional application No. 62/872,626, filed on Jul. 10, 2019.

(51) Int. Cl.
*G06F 9/44* (2018.01)
*G06F 9/455* (2018.01)
*G06F 9/54* (2006.01)

(52) U.S. Cl.
CPC .......... *G06F 9/45558* (2013.01); *G06F 9/541* (2013.01); *G06F 2009/4557* (2013.01)

(58) Field of Classification Search
CPC ................................................. G06F 9/45558
(Continued)

(56) References Cited

U.S. PATENT DOCUMENTS

2019/0126831 A1    5/2019   Arciniaga et al.

FOREIGN PATENT DOCUMENTS

EP    3070607 A1    9/2016

OTHER PUBLICATIONS

International Search Report and Written Opinion of PCT/IB2020/056526 mailed Oct. 22, 2020.
(Continued)

*Primary Examiner* — Timothy A Mudrick
(74) *Attorney, Agent, or Firm* — Brian D. Kaul; Westman, Champlin & Koehler, P.A.

(57) ABSTRACT

A vehicle computing architecture includes an application layer a software virtualization layer, a hardware virtualization layer, and a hardware component layer. The application layer includes a plurality of virtual functional components each representing a virtual function. The software virtualization layer includes a command registry having virtual commands. The hardware virtualization layer includes mapping logic. The hardware component layer includes a plurality of physical nodes each being a virtual representation of a corresponding hardware component. The virtual functional components call a virtual command from the command registry. The hardware virtualization layer selects one of the physical nodes corresponding to the received virtual command and translates the received virtual command to a hardware command using the mapping logic, and communicates the hardware command to the selected physical node. The hardware component layer communicates the hardware command to the hardware component to perform the corresponding vehicle function.

15 Claims, 7 Drawing Sheets

(58) Field of Classification Search
USPC .............................................................. 718/1
See application file for complete search history.

(56) References Cited

OTHER PUBLICATIONS

Gerd Kainz et al. "Experimental Platform for Innovative ICT Car Architecture", Jan. 1, 2010, pp. 1-4.
Alois Knoll et al. "Electric Mobility: Chances and Technical Challenges", Nov. 1, 2013, pp. 47-62.
Communication pursuant to Article 94(3) EPC for corresponding European Patent Application No. 20742501.8 dated Dec. 15, 2023.
Christian Buckl et al., "The software car: Building ICT architectures for future electric vehicles", Electric Vehicle Conference (IEVC), 2012 IEEE International, IEEE, Mar. 4, 2012, pp. 1-8, XP032166587, DOI: 10.1109/IEVC.2012.6183198, ISBN: 978-1-4673-1562-3.
Stahle Hauke et al., "Towards the deployment of a centralized ICT architecture in the automotive domain", 2013 2nd Mediterranean Conference On Embedded Computing (MECO), IEEE, Jun. 15, 2013, pp. 66-69, XP032485071, ISSN: 1800-993X, DOI: 10.1109/MECO.2013.6601320, [retrieved on Sep. 16, 2013].

COMPUTING ARCHITECTURE FOR VEHICLE HARDWARE AND FEATURE VIRTUALIZATION

CROSS-REFERENCE TO RELATED APPLICATION

This Application is a Section 371 National Stage Application of International Application No. PCT/IB2020/056526, filed Jul. 10, 2020 and published as WO 2021/005576 A1 on Jan. 14, 2021, in English, which claims the benefit of U.S. Provisional Application Ser. No. 62/872,626 which was filed Jul. 10, 2019; the contents of which are hereby incorporated by reference in their entirety.

FIELD

Embodiments of the present disclosure relate to a computing architecture for a vehicle that provides a virtual representation of the vehicle's hardware and features performed by using the hardware.

BACKGROUND

Today's vehicles use a multitude of hardware components to fulfill specific functions, typically under control of a main control unit. These hardware components range from a simple sensor, which may be used to capture the temperature of the engine or the pressure of a tire, to more elaborate units that host a microprocessor, memory and embedded software to execute complex functions like optimized fuel injection control.

The control of the interaction between hardware and software in a vehicle may take on various forms. In order for a main control unit of the vehicle to control the various hardware components and implement vehicle functions, conventional vehicle computing architectures utilize specific point-to-point integrations with each hardware component, which may be sourced from different OEM manufacturers.

As an example, a modern car is a complex system with a multitude of hardware components, which are typically referred to as electronic control units (ECU), each responsible for handling a specific task. This allows manufacturers to work with a multitude of suppliers where each can specialize at a given task, while manufacturers keep the complexity manageable at the system level.

This specialization of the hardware components leads to optimized solutions with their specific interfaces. Integrating these solutions at the system level requires point-to-point integrations for the different components using an integration layer of the vehicle computing architecture. The integration layer carries the burden of handling information sharing between components. This adds complexity, limits flexibility and hampers the introduction of advanced functions that require information from a multitude of components. Furthermore, any revision of an underlying hardware component requires an update to the integration layer.

Early computerization of automobiles was manageable, because most of the systems tended to operate on an individual basis. Simplistically, one could say there was one system layer that controlled the different components individually.

As the systems evolved, and more complex functions were added, the interaction and dependency between hardware components increased. This led to a point where point-to-point integrations became untenable.

The response to this challenge has been to apply a well-established approach from the software engineering discipline: component abstraction. Component abstraction uses software component representations to form a common representation and communication model among the hardware components and the management layer.

Such component abstractions are typically 'containerized' by applying container technology to guarantee operational independence between the different software component representations. While this provides additional stability and maintainability at the system level, it doesn't fundamentally change the way the components are modeled (at the ECU level) and the data exchanged.

The amount of data generated/collected by different vehicle hardware components has dramatically increased. For example, vehicles now collect data from cameras, radar, internet connections, and other sources. As a result, adding more intelligence to a vehicle generally requires combining more data from different sources. This puts an extra burden on handling the available data between different hardware components.

SUMMARY

Embodiments of the present disclosure are directed to vehicle computing architectures for a mobile vehicle having a plurality of hardware components that are each configured to perform a vehicle function, methods of controlling the hardware components of a mobile vehicle using the vehicle computing architectures, and mobile vehicles comprising the vehicle computing architectures. The vehicle computing architectures are implemented by at least one processor in response to the execution of instructions stored in non-transitory computer readable media. In one embodiment, the vehicle computing architecture includes an application layer, a software virtualization layer, a hardware virtualization layer, and a hardware component layer. The application layer includes a plurality of virtual functional components, each virtual functional component representing a virtual function comprising one or more of the vehicle functions. The software virtualization layer includes a command registry having virtual commands for vehicle functions that are available to each virtual functional component to perform their corresponding virtual function. The hardware virtualization layer includes mapping logic that maps virtual commands to hardware commands. The hardware component layer includes a plurality of physical nodes, each physical node being a virtual representation of a corresponding hardware component. The virtual functional components are each configured to call a virtual command from the command registry to perform a corresponding vehicle function, which is configured to at least partially complete the virtual function represented by the virtual functional component. The hardware virtualization layer is configured to receive a virtual command called by one of the virtual functional components from the software virtualization layer, select one of the physical nodes corresponding to the received virtual command using the mapping logic, translate the received virtual command to a hardware command using the mapping logic, and communicate the hardware command to the selected physical node. The hardware component layer is configured to communicate the hardware command to the hardware component corresponding to the selected physical node to perform the corresponding vehicle function.

In a method of controlling hardware components of a mobile vehicle, each hardware component configured to perform a vehicle function, acts performed are performed by a vehicle computing architecture in response to the execution of instructions by at least one processor stored in non-transitory computer readable media. The acts include providing an application layer comprising a plurality of virtual functional components, each virtual functional component representing a virtual function comprising one or more of the vehicle functions, providing a software virtualization layer including a command registry including virtual commands for vehicle functions that are available to each virtual functional component to perform their corresponding virtual function, providing a hardware virtualization layer comprising mapping logic that maps virtual commands to hardware commands, providing a hardware component layer comprising a plurality of physical nodes, each physical node being a virtual representation of a corresponding hardware component, calling a virtual command from the command registry using a virtual functional component to perform a corresponding vehicle function, which is configured to at least partially complete the virtual function represented by the virtual functional component, communicating the virtual command from the software virtualization layer to the hardware virtualization layer, selecting one of the physical nodes corresponding to the received virtual command using the mapping logic using the hardware virtualization layer, translating the received virtual command to a hardware command using the mapping logic using the hardware virtualization layer, communicating the hardware command to a selected hardware component corresponding to the selected physical node using the hardware virtualization layer, and performing the vehicle function corresponding to the hardware command using the selected hardware component.

One embodiment of the mobile vehicle includes a plurality of hardware components each configured to perform a vehicle function; and a vehicle computing architecture implemented by at least one processor in response to the execution of instructions stored in non-transitory computer readable media. The vehicle computing architecture includes an application layer, a software virtualization layer, a hardware virtualization layer, and a hardware component layer. The application layer includes a plurality of virtual functional components, each virtual functional component representing a virtual function comprising one or more of the vehicle functions. The software virtualization layer includes a command registry including virtual commands for vehicle functions that are available to each virtual functional component to perform their corresponding virtual function. The hardware virtualization layer includes mapping logic that maps virtual commands to hardware commands. The hardware component layer includes a plurality of physical nodes, each physical node being a virtual representation of a corresponding hardware component. The virtual functional components are each configured to call a virtual command from the command registry to perform a corresponding vehicle function, which is configured to at least partially complete the virtual function represented by the virtual functional component. The hardware virtualization layer is configured to receive a virtual command called by one of the virtual functional components from the software virtualization layer, select one of the physical nodes corresponding to the received virtual command using the mapping logic, translate the received virtual command to a hardware command using the mapping logic, and communicate the hardware command to the hardware component corresponding to the selected physical node to perform the corresponding vehicle function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, conventional circuits, systems, networks, processes, frames, supports, connectors, motors, processors, and other components may not be shown, or shown in block diagram form in order to not obscure the embodiments in unnecessary detail.

As will further be appreciated by one of skill in the art, embodiments of the present disclosure may be embodied as methods, systems, devices, and/or computer program products, for example. The computer program or software aspect of embodiments of the present disclosure may comprise computer readable instructions or code stored in a non-transitory computer readable medium or memory. Execution of the program instructions by one or more processors (e.g., central processing unit, microprocessor, microcontroller, etc.) results in the one or more processors performing one or more functions or method steps described herein. Any suitable patent subject matter eligible computer readable media or memory may be utilized including, for example, hard disks, CD-ROMs, optical storage devices, magnetic storage devices, etc.

Embodiments of the present disclosure generally relate to a computing architecture that improves mobile vehicle component modeling and data exchange over conventional techniques. Rather than modeling specific electronic control unit (ECU) components, embodiments of the computing architecture looks at the vehicle functions that need to be managed and represents the vehicle functions in a manner that is independent of the underlying hardware.

While this modeling of the vehicle functions may be grouped logically based on the corresponding hardware component that is configured to carry out the function as a matter of convenience and organization, it is not a reflection of the existing hardware. That is, the modeled functions naturally form the standard interface of communication between vehicle hardware components and are free of any hardware related limitation. The modeled functions only describe behavior.

Figure 1:
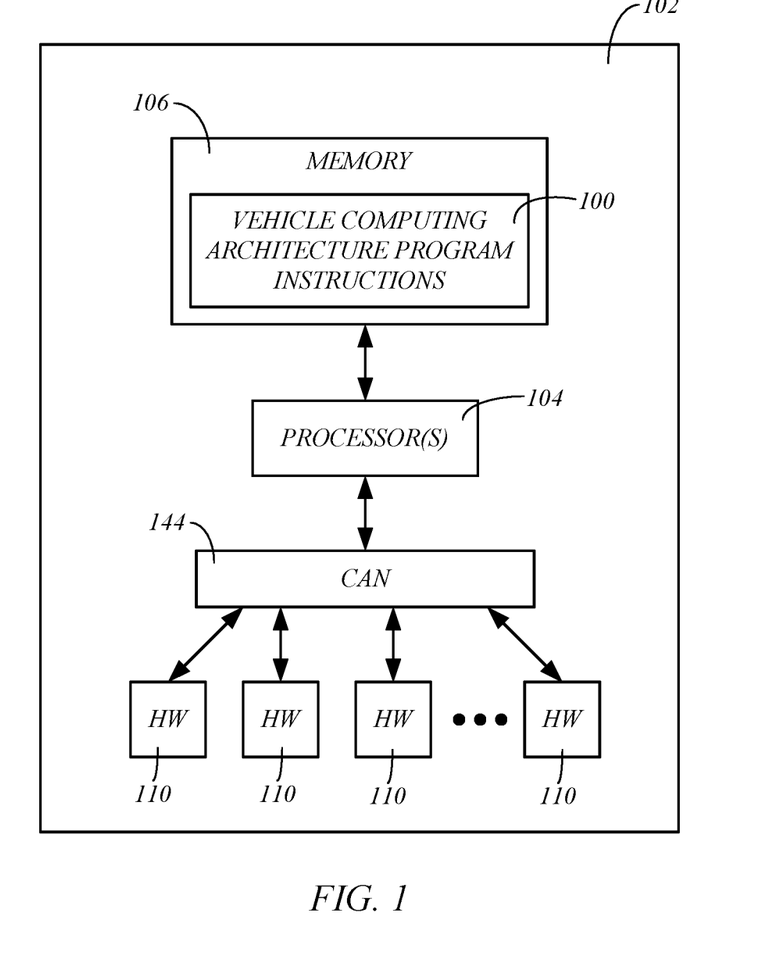
FIG. 1 is a simplified diagram of an example of a motor vehicle having a vehicle computing architecture, in accordance with embodiments of the present disclosure.

FIG. 1 is a simplified diagram of a vehicle computing architecture 100 of a mobile vehicle 102 in accordance with embodiments of the present disclosure. The vehicle computing architecture 100 may be implemented by at least one processor 104 in response to the execution of instructions contained in non-transitory computer readable media or memory 106.

The mobile vehicle 102, in which the vehicle computing architecture 100 is implemented, is a physical, real-world vehicle and may take on any suitable form. The mobile vehicle 102 includes a plurality of hardware components, generally referred to as 110, each of which is configured to perform a vehicle function. In some embodiments, the mobile vehicle 102 is an automobile, a two-wheeled vehicle (e.g., a motorcycle, an electric bicycle), a boat or watercraft (e.g., personal watercraft), an electric vehicle that does not require a driver's license or permit to operate (e.g., a golf cart, a scooter, a personal electric vehicle), or another mobile vehicle 102. Each of the hardware components 110 is configured to perform a vehicle function either passively (e.g., a sensor providing a value output of a parameter) or actively in response to a hardware command.

Examples of hardware components 100 and their vehicle functions include headlights configured to provide forward illumination, taillights configured to provide rearward illumination, a blinker light configured to provide a turn signal, a sensor configured to detect or measure a value of a parameter of the vehicle, a temperature sensor configured to sense a temperature (e.g., engine temperature, cabin temperature, etc.), a pressure sensor configured to sense a pressure (e.g., tire pressure), a heads-up display configured to display information on a windshield of the vehicle, a dashboard screen configured to display information, a USB connector configured to connect to an electronic device, a wireless communication adapter configured to handle wireless data communications (e.g., Wi-Fi, cellular communications) for communicating data, a data communication adapter configured to handle data communications, a global positioning system (GPS) unit configured to receive vehicle position information, a navigation unit configured to provide navigational information, a user-input device (e.g., voice input, keyboard, button, etc.) configured to receive a user input, an electronic control unit (ECU) configured to control a hardware component, and other hardware components for use in mobile vehicle 102s that are configured to perform a vehicle function. Embodiments of the present disclosure are not limited to use with the hardware components 110 mentioned above. Thus, embodiments of the present disclosure include the use of the vehicle computing architecture 100 with other hardware components 110 of mobile vehicle 102s that are not mentioned above.

Figure 2:
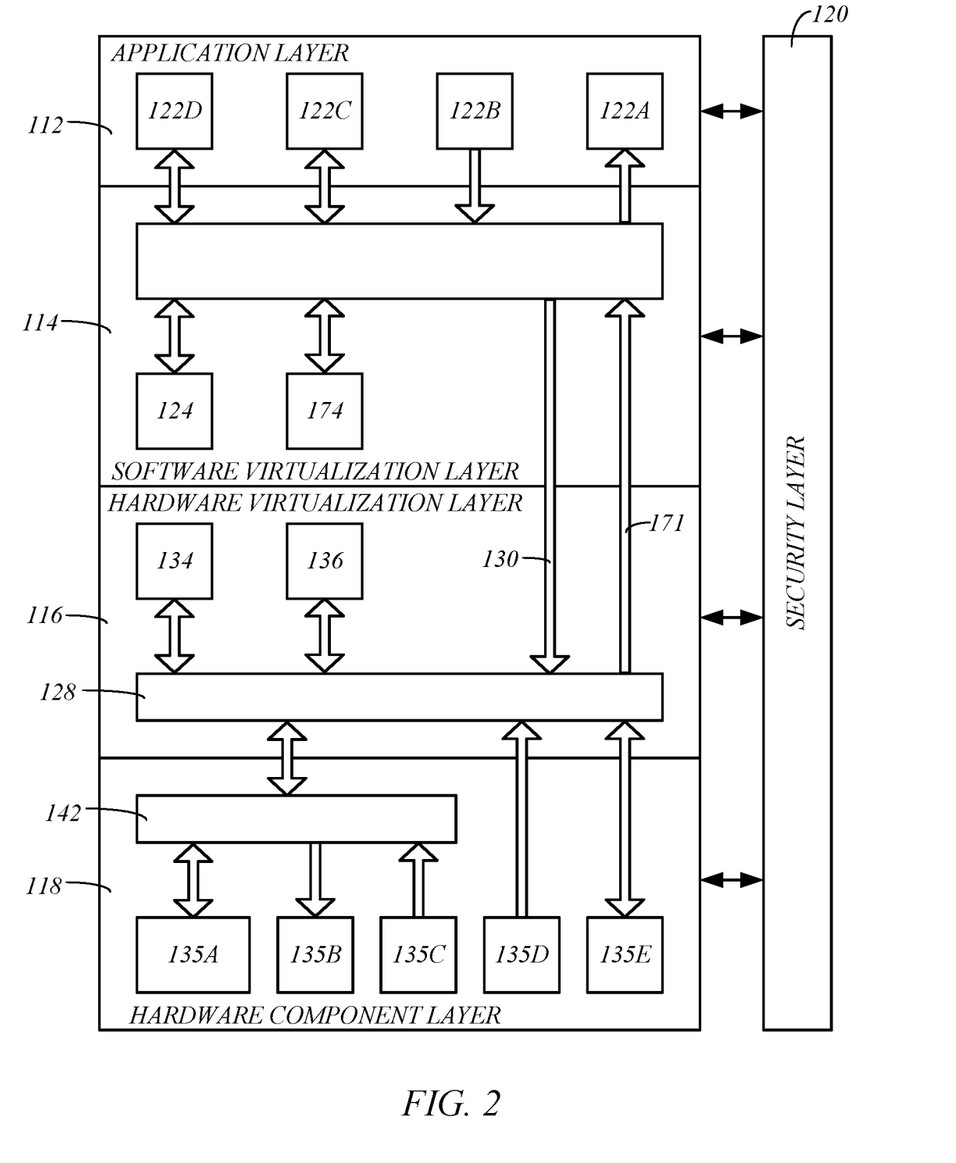
FIG. 2 is a simplified diagram of an example of the vehicle computing architecture of FIG. 1, in accordance with embodiments of the present disclosure.
Figure 3:
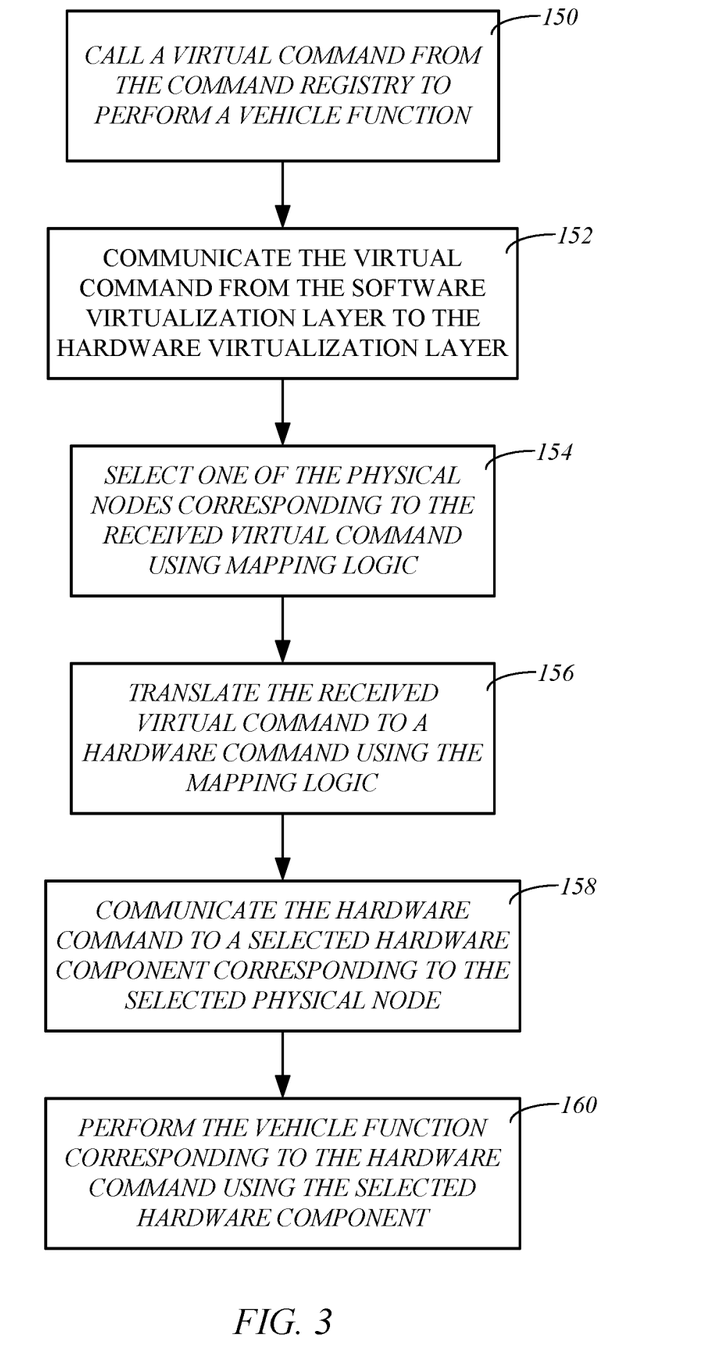
FIG. 3 is a flowchart illustrating a method of controlling hardware components of a mobile vehicle using the vehicle computing architecture, in accordance with embodiments of the present disclosure.
Figure 4:
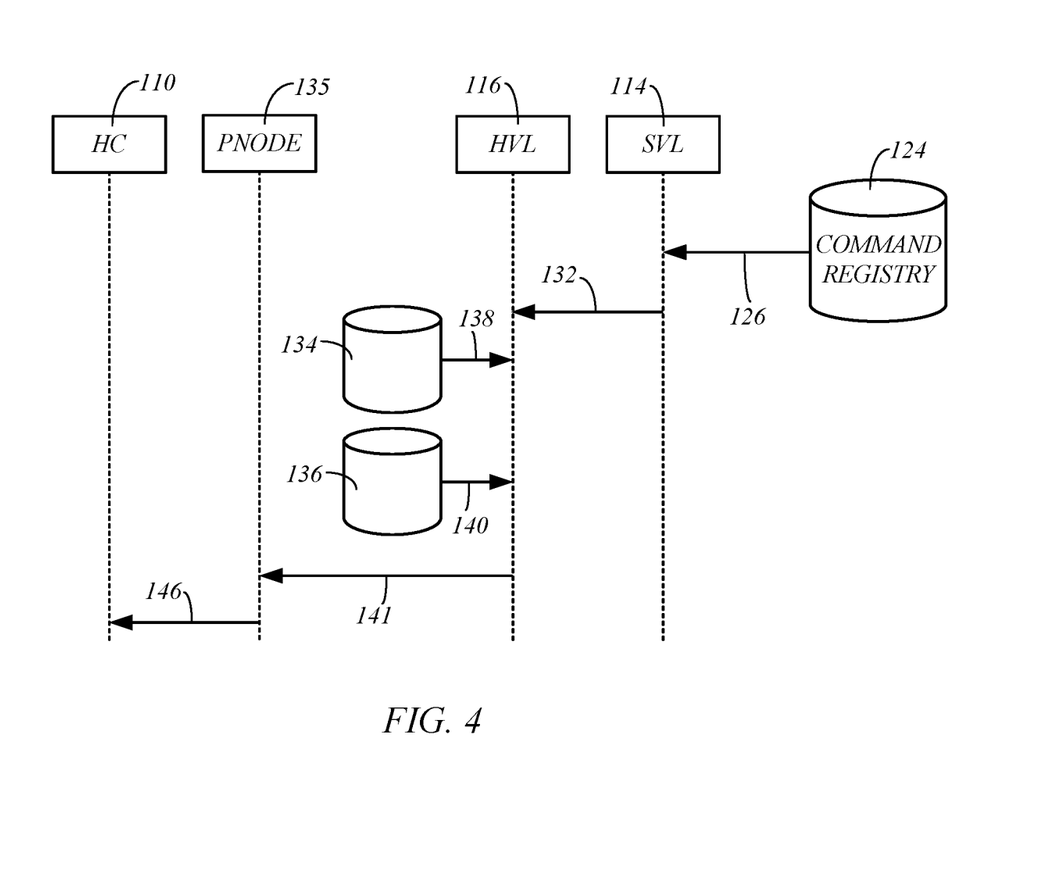
FIG. 4 is an example of an instruction or command flow in response to the calling of a virtual command, in accordance with embodiments of the present disclosure.

FIG. 2 is a simplified diagram of an example of the vehicle computing architecture 100 of FIG. 1, FIG. 3 is a flowchart illustrating a method of controlling hardware components 110 of a mobile vehicle 102 using the vehicle computing architecture 100, and FIG. 4 is an example of an instruction or command flow in response to the calling of a virtual command, in accordance with embodiments of the present disclosure.

In some embodiments, the architecture 100 includes an application layer 112, a software virtualization layer 114, a hardware virtualization layer 116, and a hardware component layer 118, as shown in FIG. 2. In some embodiments, the vehicle computing architecture 100 includes a security layer 120 that provides encryption and authentication services for communications between the layers of the vehicle computing architecture 100, such as between the application layer 112 and the software virtualization layer 114, between the software virtualization layer 114 and the hardware virtualization layer 116, and/or between the hardware virtualization layer 116 and the hardware component layer 118. Thus, all of the layers of the vehicle computing architecture 100 may have access to the security layer 120, as indicated in FIG. 2.

The application layer 112 includes a plurality of virtual functional components, which are generally referred to as 122. In one embodiment, the virtual functional components 122 represent a virtual function comprising one or more of the vehicle functions that may be performed by the hardware components 110 of the mobile vehicle 102. Also, the virtual functional components 122 may each provide an abstract representation of one or more data elements, or a combination of both vehicle functions and data elements of the mobile vehicle 102 being modeled.

Each virtual functional component 122 abstracts the virtual functions and/or the data elements from their actual realization or implementation, such as whether the functions are realized in hardware, software, or a combination thereof. Each virtual functional component 122 is connected to the software virtualization layer 114 and can have inputs for receiving communications from the software virtualization layer 114, as indicated by virtual functional component 122A, outputs for communicating information to the software virtualization layer 114, as indicated by virtual functional component 122B, or inputs and outputs, as indicated by virtual functional components 122C and 122D, as shown in FIG. 2.

As an example, virtual functional components 122 can represent virtual functions that are realized through one or more of the hardware components 110, such as an electronic control unit (ECU) of the mobile vehicle 102, which may take the form of a transmission control unit or an engine control unit. A virtual functional component 122 can also represent a virtual function in the form of a sensor function, such as a temperature sensor or a tire pressure sensor, or a data element corresponding to a sensor value issued by a sensor, such as a temperature value, for example. A virtual functional component can also represent an output function like a dashboard screen or a heads-up display (HUD).

Virtual functional components 122 can also represent a service function, such as a navigation system that provides guidance to the user. A virtual functional component 122 can also represent a remote service function, such as a cloud weather service, for example.

The virtual functions represented by the virtual functional components 122 may comprise one or more of the vehicle functions performed by one or more of the hardware components 110. Accordingly, virtual functional components 122 do not have to map directly, one-to-one to a physical hardware component 110 of the mobile vehicle 102. In some embodiments, virtual functional components 122 do not necessarily need to have a physical hardware component counterpart. Additionally, virtual functional components 122 can be composed of other virtual functional components 122. For instance, the virtual function performed by one virtual functional component may comprise sub-virtual functions that are performed by other virtual functional components.

One embodiment of the software virtualization layer 114 includes a command registry 124. The command registry 124 includes all of the virtual commands for vehicle functions that are available to each of the virtual functional components 122 to perform their corresponding virtual function. The software virtualization layer 114 exposes the command registry 124 to the application layer 112 and its virtual functional components 122, which allows the virtual functional components 122 to call the virtual commands required to execute their virtual functions in the physical world using one or more of the hardware components 110. In some embodiments, the virtual commands may be called by the software virtualization layer 114.

The virtual commands may be high-level or abstract representations of a request for the performance of a function with an optional list of parameters. In some embodiments, the virtual commands may include one or more instruction sequences, and optional parameters for completing the one or more vehicle functions to be performed. For example, a virtual command may represent a request to "turn on the headlights," "sound the horn," or other high-level requests.

In some embodiments, due to the high-level or abstract representation of the requests provided by the virtual commands, the format of the virtual command is independent of the format of the corresponding commands to be executed by the hardware components 110 to perform the vehicle functions of the virtual command. This operates to decouple the virtual functional components 122 of the architecture 100 from the underlying hardware components 110, and allows the architecture 100 to be flexible and easily scalable.

Thus, each virtual functional component 122 is configured to call a virtual command from the command registry 124 to perform a corresponding vehicle function, which is configured to at least partially complete the virtual function represented by the virtual functional component. This calling of a virtual command is represented by the communication 126 in FIG. 4 from the command registry 124, which is received by the software virtualization layer 114.

Embodiments of the hardware virtualization layer 116 are configured to convert called virtual commands into hardware commands that are configured for execution by the hardware components 110 of the vehicle. Functions performed by the hardware virtualization layer 116 described herein may be performed by a real-time hypervisor 128, which may resemble a type-one, native or bare-metal hypervisor by running directly on the embedded hardware, for example.

In some embodiments, the hardware virtualization layer 116 is configured to receive virtual commands from the software virtualization layer 114 called from the command registry 124 by the virtual functional components 122 or the software virtualization layer 114, as indicated by the communication 130 in FIG. 2 and the communication 132 in FIG. 4. These and other communications between the software virtualization layer 114 and the hardware virtualization layer 116 may be facilitated by one or multiple connections between the layers 114 and 116, which may include one or more dedicated channels.

The hardware virtualization layer 116 includes mapping logic 134 which may also include data. The mapping logic 134 identifies physical nodes 135 (FIG. 2) of the hardware component layer 118 for performing the instructions contained within a received virtual command. The hardware virtualization layer 116 also includes mapping logic 136, which may include data, that maps one or more hardware commands and optional parameters to the virtual commands. The mapping logic 134 and the mapping logic 136 may be combined into a single database.

The hardware virtualization layer 116 is configured to first use the mapping logic 134 to identify and select the physical nodes 135 corresponding to the virtual command, as indicated by the communication 138 in FIG. 4. The hardware virtualization layer 116 then translates the virtual command into one or more hardware commands using the mapping logic 136, as indicated by the communication 140 in FIG. 4. This translation modifies the sequence of one or more instructions of the virtual command to a format that is suitable for execution by the one or more hardware components 110 of the corresponding physical nodes 135.

After the hardware virtualization layer 116 selects the physical nodes 135 corresponding to the received virtual commands using the mapping logic 134 and translates the received virtual commands to corresponding hardware commands using the mapping logic 136, the hardware virtualization layer 116 communicates the hardware commands to the hardware component layer 118 as indicated by the communication 141 shown in FIG. 4. Communications between the hardware virtualization layer 116 and the hardware component layer 118 may be conducted over a single communication bus or multiple communication buses.

The hardware component layer 118 includes a plurality of the physical nodes (PNODE's) 135. Each physical node 135 is a virtual or abstract representation of one of the hardware components 110 of the mobile vehicle 102. The physical nodes 135 can have inputs for receiving data, such as indicated by the physical nodes 135B and 135E, outputs for transmitting data, such as indicated by the physical nodes 135C and 135D, or both inputs and outputs, as indicated by the physical node 135A. Each physical node is either connected to the hardware virtualization layer 116 (e.g., the real-time hypervisor), as indicated by physical nodes 135D and 135E, or to a local communication bus 142, as indicated by physical nodes 135A-C. The local communication bus 142 is configured to communicate with the hardware virtualization layer 116, such as the real-time hypervisor 128.

The physical nodes 135 having inputs may receive physical node instructions (e.g., hardware commands) from the hardware virtualization layer 116 that can be executed by the corresponding physical node 135. Thus, sending a physical node instruction to the input of a physical node 135 results in an action, and possibly a response in the form of an output from the output of a physical node 135.

In some embodiments, the hardware component layer 118 communicates the hardware commands received from the hardware virtualization layer 116 to the corresponding hardware components 110, such as through a controller area network (CAN) 144 or another suitable signal bus, as indicated in FIG. 1. This communication of the hardware commands to the corresponding hardware components 110 is also represented by the communication 146 in FIG. 4. The hardware components 110 execute the hardware commands corresponding to the called virtual commands, and perform the corresponding vehicle functions.

With the vehicle computing architecture 100 in accordance with one or more embodiments described herein provided in response to the execution of the program instructions by one or more processors, such as processor 104 (FIG. 1), the method of FIG. 3 may be performed. At 150, a virtual command is called from the command registry 124 of the software virtualization layer 114 to perform at least one vehicle function. This calling of the virtual command may be performed by one of the virtual functional components 122 or the software virtualization layer 114. As mentioned above, the virtual function corresponding to a virtual functional component 122 may correspond to one or more vehicle functions. Additionally, the virtual command may correspond to one or more vehicle functions.

At 152, the virtual command is communicated from the software virtualization layer 114 to the hardware virtualization layer 116, as indicated by the communication 130 in FIGS. 2 and 132 in FIG. 4. As mentioned above, acts that are stated as being performed by the hardware virtualization layer 116 may be performed using the real-time hypervisor 128 described above.

The mapping logic 134 of the hardware virtualization layer 116 identifies the physical nodes 135 for performing the instructions contained within the virtual command. The hardware virtualization layer 116 uses the mapping logic 134 and the virtual command to identify and select the corresponding physical nodes 135 at 154 of the method. At 156, the hardware virtualization layer 116 uses the mapping logic to translate the instructions and possibly the parameters of the virtual command to a hardware command. This translation modifies the sequence of one or more instructions of the virtual command to a format that is suitable for execution by the one or more hardware components 110 of the corresponding physical nodes 135.

The hardware virtualization layer 116 then communicates the hardware command to the hardware component layer 118, which in turn communicates the hardware command to one or more selected hardware components 110 corresponding to the selected physical nodes 135, at 158. The selected hardware components 110 then execute the hardware command and perform the corresponding vehicle function, at 160.

This method may be performed for each of a series of virtual commands issued by the virtual functional components 122 and/or the software virtualization layer 114, to control the hardware components 110 to perform various vehicle tasks and functions.

Figure 5:
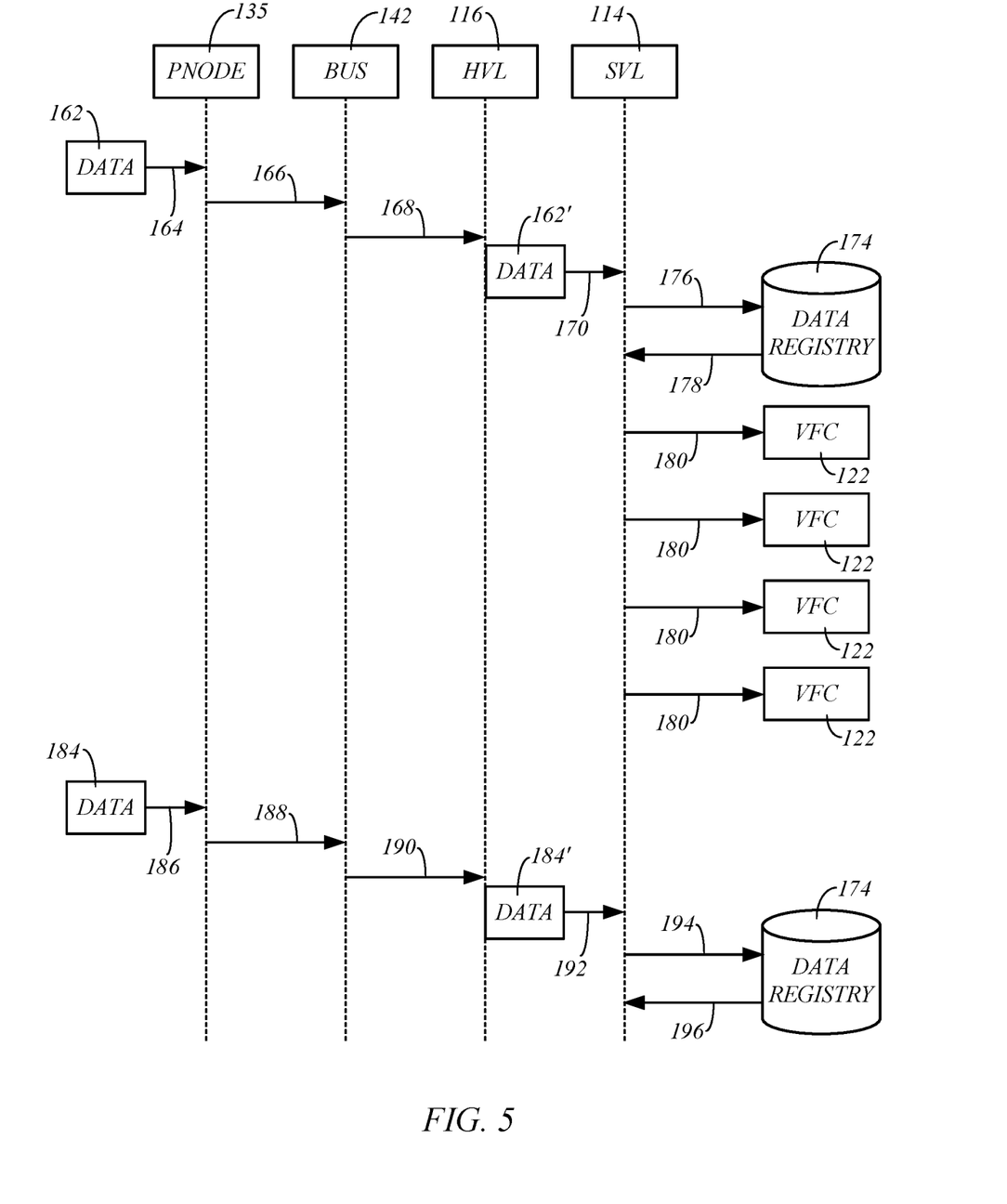
FIG. 5 is a simplified diagram of a data flow through the vehicle computing architecture, in accordance with embodiments of the present disclosure.

Additional embodiments relate to a data flow from the hardware components 110 or the hardware component layer 118 to the software virtualization layer 114, an example of which is illustrated in the simplified diagram of FIG. 5. In some embodiments, one or more of the hardware components 110 are configured to output data elements. Each of the data elements may represent a value of a parameter of the mobile vehicle 102, such as an engine temperature output from a temperature sensor, for example. Other examples of the parameters that may be represented by the data elements output from the hardware components 110 include a pressure, weather data, a cellular connection state, a global positioning system connection state, GPS location information, a state of connection to an internet service, and other parameters of the mobile vehicle 102.

When data or a data element 162 is produced by one of the hardware components 110, the data element may be communicated to a corresponding physical node 135 through the CAN bus 144 (FIG. 1) or another suitable interface, as indicated at 164 in FIG. 5. In one embodiment, one communication bus is used for communicating the hardware commands from the hardware virtualization layer 116 to the hardware component layer 118, and another communication bus is used for communicating the data elements from the hardware components 110 or the hardware component layer 118 to the hardware virtualization layer 116.

The received data element 162 may then be communicated to the hardware virtualization layer 116, as indicated by the communications 166 and 168 shown in FIG. 5, such as through the local communication bus 142. The hardware virtualization layer 116 may be configured to handle scaler, vector or structure data, for example.

In some embodiments, the hardware virtualization layer 116 translates or decodes the data element 162 received from the physical nodes 135 to a standardized format before communicating it to the software virtualization layer 114, as indicated at 170 in FIGS. 5 and 171 in FIG. 2. For example, the data element 162 may represent a GPS location from a GPS location sensor hardware component 110 in the National Marine Electronics Association (NMEA) format. The data element 162 in the NMEA format is communicated from a physical node 135 to the hardware virtualization layer 116, which may decode or translate the NMEA format data element 162 into a standardized format data element 162' that is expected by the software virtualization layer 114, such as a latitude/longitude format that is suitable for the virtual functional components 122.

The software virtualization layer 114 may include a data registry 174 that is accessible by the plurality of virtual functional components 122, and includes state information, such as a current state of each of the virtual functional components 122 and/or each of the physical nodes 135. In some embodiments, the software virtualization layer 114 updates the state information within the data registry 174 based on the data elements received from the hardware virtualization layer 116, as indicated by the communication 176 in FIG. 5. In the event that a change to the data registry 174 is performed as a result of the received translated data element 162', the data registry 174 provides a notification 178 indicating to the software virtualization layer 114 that a change has been made to the data registry 174. In some embodiments, the software virtualization layer 114 provides a notification 180 to the application layer 112 or one or more of the virtual functional components 122 that there is a new or updated value in the data registry 174.

In another example, a data element 184 may be received by a physical node 135 through a communication 186, and communicated to the hardware virtualization layer 116 through communications 188 and 190, as shown in FIG. 5. The hardware virtualization layer 116 may translate the data element 184 to a translated data element 184' and communicate the translated data element 184' to the software virtualization layer 114 though a communications 192. When the software virtualization layer 114 updates the data registry 174 (communication 194), the data registry 174 returns a communication 196 indicating that no change has been made because of the data element 184'. In this case, the software virtualization layer 114 may not provide a notification to the application layer 112 or to the virtual functional components 122.

In some embodiments, when the virtual functional components 122 receive an update from the software virtualization layer 114 that the data registry 174 has been modified, the virtual functional components 122 may initiate an action. For example, when the value updated in the data registry 174 indicates a change in a GPS position of the mobile vehicle 102, a virtual functional component 122 may call a virtual command to initiate a navigation instruction.

As a result, the data registry 174 of the software virtualization layer 114 contains real-time up-to-date state information including the current state of each of the virtual functional components 122 of each of the physical nodes 135.

Figure 6:
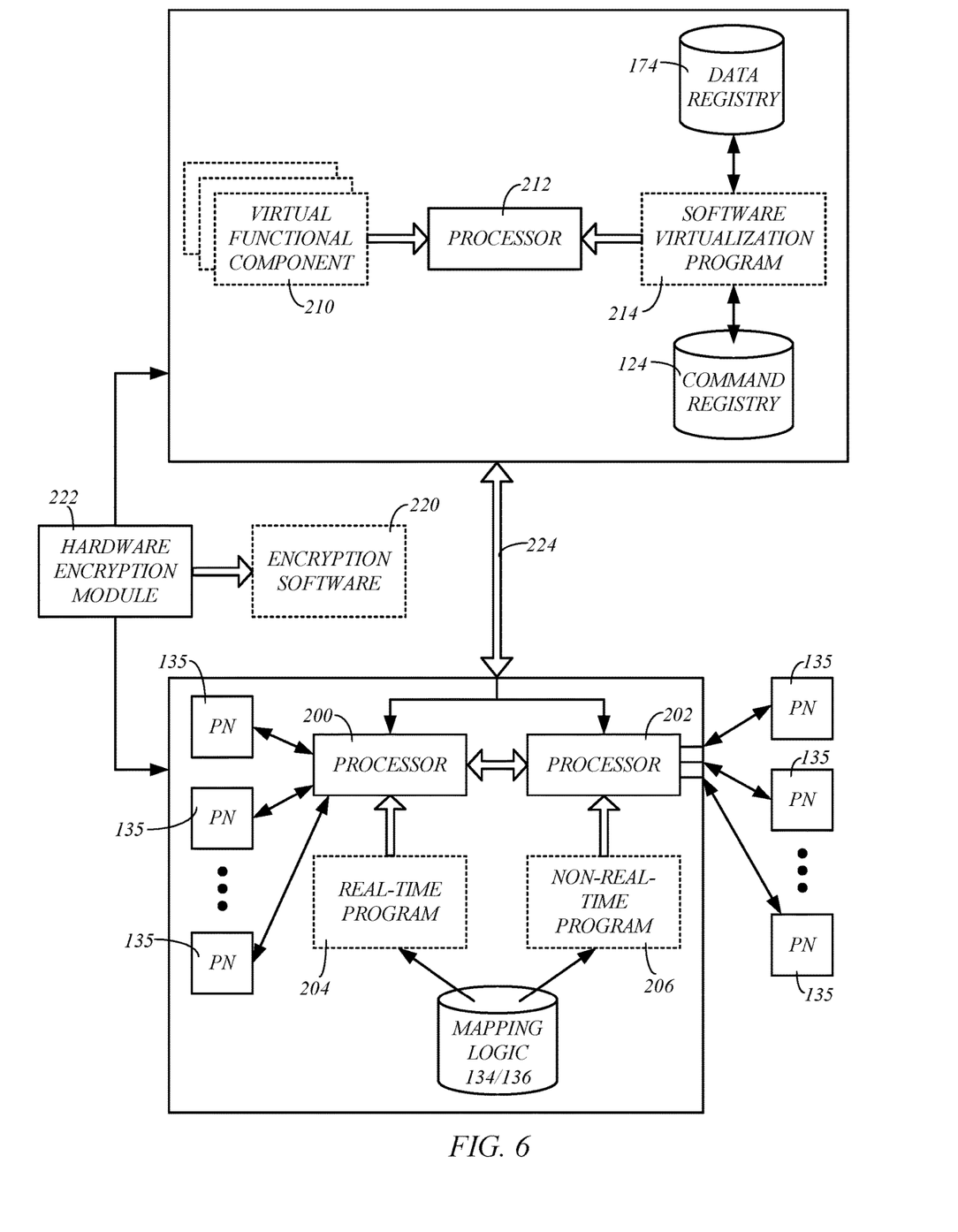
FIG. 6 illustrates exemplary hardware for implementing the vehicle computing architecture, in accordance with embodiments of the present disclosure.

FIG. 6 illustrates exemplary hardware for implementing the vehicle computing architecture 100, in accordance with embodiments of the present disclosure. In some embodiments, the time-critical or real-time functions of the hardware virtualization layer 116 may be handled by a first processor 200, such as microcontroller, while the higher-level functions like managing a display and image recognition on camera images may be performed using a second processor 202, such as a more powerful microprocessor. That is, a real-time program 204 may be executed by the processor 200 to implement the real-time hypervisor 128, and a non-real-time program 206 may be executed by the processor 202 to provide the desired higher-level function for the hypervisor 128 or the hardware virtualization layer 116. In some embodiments, both the processor 200 and the processor 202 may consult the mapping logic 134 and 136 (e.g., a local database or table) to map the virtual commands to the hardware commands, and to identify the one or more physical nodes 135 corresponding to the virtual commands, as discussed above.

Different hardware embodiments can be realized using the separate processors 200 and 202. For instance, the processor 200 may operate with physical nodes 135 corresponding to hardware components 110 in the form of a Bluetooth receiver, a cellular communications adapter, or a CAN transceiver, while the processor 202 may operate with physical nodes 135 corresponding to hardware components 110 in the form of a display for a camera, for example.

In some embodiments, the program instructions 210 for the virtual functional components 122 of the application layer 112 may be processed by a processor 212. The processor 212 may also be configured to execute the program instructions 214 for the software virtualization layer 114, and access the command registry 124 and the data registry 174.

In some embodiments, the security layer 120 may be implemented through the execution of encryption software 220 by a hardware encryption module 222, as shown in FIG. 6. This allows the security of layer 120 to provide encryption and authentication services for one or more of the communications described herein between the various layers of the vehicle computing architecture 100, including a secure communication channel 224 between the software virtualization layer 114 and the hardware virtualization layer 116.

In some embodiments, the hardware encryption module 222 includes a hardware security processor that may be configured to manage multiple storage slots of encryption and decryption software keys, and manage a generator/data frame sequence number manager (e.g., random number generator coupled with federal information processing standards). Thus, the security layer 120 can avoid any kind of memory storage of the security key, since it is the hardware security processor that encrypts and decrypts the data. As a result, a malicious person or process cannot recover the key from memory. The hardware security processor can also authenticate and retain confidentiality of non-volatile data. Additionally, this hardware security processor can control any data frame (integrity, sequencing) passing through it. Each frame may be sequenced through a number generated and tagged by a unique identifier to allow sequencing control and frame integrity. Thus, it is intended to avoid any "replay" of frames interleaving in the event that a malicious person or process would recover a structuring of network frame.

The multiple potential keys allow for the use of an encryption key for each action. For example, the key for encrypting/decrypting data from one hardware component (e.g., accelerometer) would not be the same as the one allowing for the encryption/decryption of another hardware component (e.g., a memory card).

The security hardware processor can also be used to encrypt external data. As a result, the security hardware processor can also function to encrypt infotainment data received from the one or more hardware components 110, such as data relating to trips made by the user, data relating to pictures taken by the user, data relating to videos recorded by the user, and data relating to videos recorded automatically by a hardware component of the mobile vehicle 102. In the event of an accident, the encrypted infotainment data may be retrieved by means of a unique decryption key to be provided by the system owner.

Figure 7:
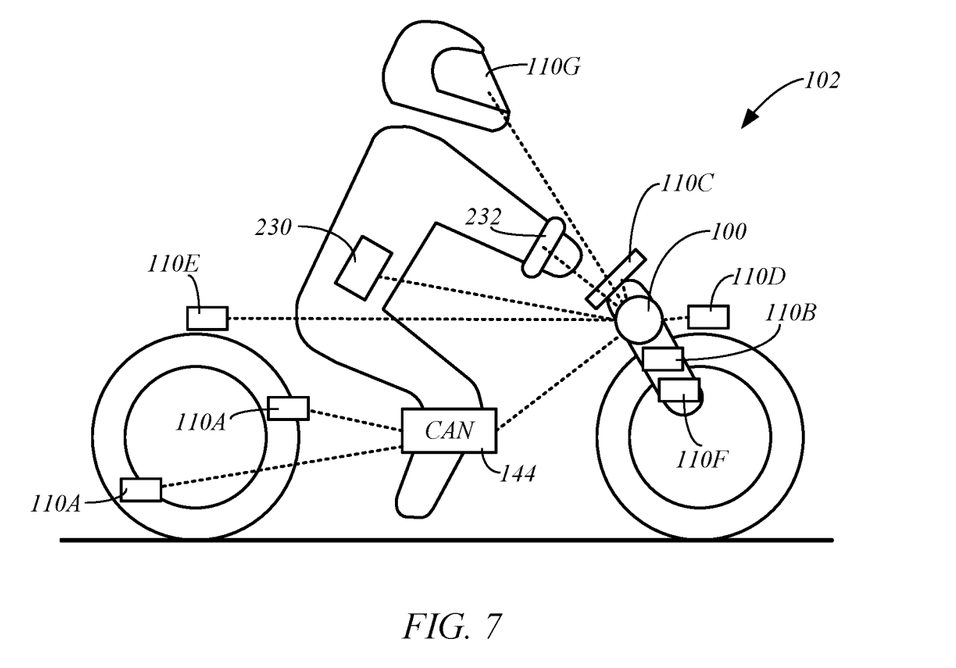
FIG. 7 is a simplified diagram illustrating an exemplary embodiment, in which the vehicle computing architecture is implemented in a mobile vehicle in the form of a two-wheeled motorbike (e.g., a motorcycle or an electric bicycle), in accordance with embodiments of the present disclosure.

FIG. 7 is a simplified diagram illustrating an exemplary embodiment, in which the vehicle computing architecture 100 is implemented in a mobile vehicle 102 in the form of a two-wheeled motor bike (e.g., a motorcycle or an electric bicycle). In the motorbike 102, a multitude of vehicle sensors 110A connect to the vehicle computing architecture 100 and provide data elements (e.g., information) to the hardware component layer 118, either directly (e.g., GNSS-based localization) or via the CAN bus 144 (e.g., tire pressure). The physical nodes 135 corresponding to the sensors 110A relay the information to the real-time hypervisor, which in turn relays information to the software virtualization layer 114 so that the information becomes available to all of the virtual functional components 122 via the data registry 174.

Other components like Bluetooth and cellular module hardware components 110B provide short and long-range connectivity to the virtual functional components 122. For example, the short-range Bluetooth module can allow a virtual functional component 122 to connect to a smartphone 230 of the user via the real-time hypervisor and relay vehicle information to a smartphone application.

Information may be presented to the driver through a screen 110C of the mobile vehicle 102. The information to be displayed may be provided by a virtual functional component 122 through the software virtualization layer 114. This bi-directional virtual functional component 122 is able to present information to the driver by calling corresponding virtual commands, and to receive commands and actions through a tactile layer of the screen 110C.

The motorbike 102 may also include front and rear cameras 110D and 110E that may also be treated as virtual functional components 122. Respective video streams (data elements) may be communicated to the hardware virtualization layer 116 or hypervisor 128, which communicates the data to the software virtualization layer 114 to have a plurality of the virtual functional components 122 perform different actions (video playback on the screen, image analysis for advanced driver-assistance systems, video recording, etc.). Similarly, virtual functional components 122 can retrieve information from the smartphone 230 of the user, such as music playlists, messages, calls, driver preferences, and/or other information, using a corresponding adapter hardware component 110F.

Through the Bluetooth module hardware component 110B of the motor bike, health information provided by a wearable device 232 of the user, such as a smartwatch, can be retrieved. This information may be used, for example, by one of the virtual functional components 122 to monitor the health of the driver and trigger an alert in case of a critical health issue.

A heads-up display (HUD) 110G may, for example, support an "eyes-on-the-road" policy by providing relevant information in the field of view of the driver. A virtual functional component 122 may provide the visual information to the HUD 110G via the hardware virtualization layer 116 and through the Bluetooth module 110B.

An interactive voice assistant virtual functional component 122 may be used to recognize speech commands captured via a microphone of the motorbike, and return spoken messages, generated by a text-to-speech engine, to the driver via Bluetooth connected headphones, for example.

A music player virtual functional component 122 may connect to a streaming music service via a cellular module hardware component, and route the stream of sound samples to headphones of the user via the Bluetooth module 110B, for example.

Although the embodiments of the present disclosure have been described with reference to preferred embodiments, workers skilled in the art will recognize that changes may be made in form and detail without departing from the spirit and scope of the present disclosure.

What is claimed is:

1. A computer-implemented method of controlling hardware components of a mobile vehicle, each hardware component configured to perform a vehicle function, the method comprising the following acts performed in response to the execution of instructions stored in non-transitory computer readable media by at least one processor, the acts comprising:
   providing an application layer comprising a plurality of virtual functional components, each virtual functional component representing a virtual function comprising one or more of the vehicle functions;
   providing a software virtualization layer including a command registry including virtual commands for vehicle functions that are available to each virtual functional component to perform their corresponding virtual function and a data registry including state information, the state information including a current state of each of the virtual functional components and each of the physical nodes;
   providing a hardware virtualization layer comprising mapping logic that maps virtual commands to hardware commands;
   providing a hardware component layer comprising a plurality of physical nodes, each physical node being a virtual representation of a corresponding hardware component;
   calling a virtual command from the command registry using a virtual functional component to perform a corresponding vehicle function, which is configured to at least partially complete the virtual function represented by the virtual functional component;
   communicating the virtual command from the software virtualization layer to the hardware virtualization layer;
   selecting one of the physical nodes corresponding to the received virtual command using the mapping logic using the hardware virtualization layer;
   translating the received virtual command to a hardware command using the mapping logic using the hardware virtualization layer including modifying a sequence of one or more instructions of the received virtual command to a format that is suitable for execution by the one or more hardware components;
   communicating the hardware command to a selected hardware component corresponding to the selected physical node using the hardware virtualization layer;
   performing the vehicle function corresponding to the hardware command using the selected hardware component;
   exposing the data registry to the plurality of virtual functional components;
   outputting data elements from one or more of the hardware components, each data element representing a value of a parameter of the mobile vehicle;
   communicating the data elements from the one or more hardware components to their corresponding physical nodes;
   communicating the data elements received by the physical nodes to the software virtualization layer using the hardware virtualization layer; and
   updating the state information based on the data elements received from the hardware virtualization layer using the software virtualization layer.

2. The method of claim 1, including notifying the application layer to changes to the state information in the data registry using the software virtualization layer.

3. The method of claim 1, including translating the data elements using the hardware virtualization layer before communicating the data elements received by the physical nodes to the software virtualization layer.

4. The method of claim 1, including providing encryption and authentication services for communications between the application layer and the software virtualization layer, between the software virtualization layer and the hardware virtualization layer, and/or between the hardware virtualization layer and the physical nodes using a security layer of the vehicle computing architecture.

5. The method of claim 1, wherein:
   the hardware components include one or more hardware components selected from the group consisting of headlights, taillights, a blinker light, a parameter sensor, a temperature sensor, a pressure sensor, a heads-up display, a dashboard screen, a USB connector, a wireless communication adapter, a data communication adapter, a global positioning system (GPS) unit, a navigational unit, a user-input device, and an electronic control unit; and
   the virtual functions represented by the virtual functional components include one or more functions selected from the group consisting of turn the headlights on or off, turn the taillights on or off, turn the blinker light on or off, obtain a value of a parameter using the parameter sensor, obtain a temperature reading from the temperature sensor, obtain a pressure reading from the pressure sensor, display information on the heads-up display, display information on the dashboard screen, detect a connection to the USB connector, detect a connection to the wireless communication adapter, receive information using the wireless communication adapter or the data communication adapter, receive weather information using the wireless communication adapter or the data communication adapter, receive music data using the wireless communication adapter or the data communication adapter, receive position information from the GPS unit, receive navigational information from the navigational unit, receive user input through the user-input device, and perform functions using the electronic control unit.

6. A mobile vehicle comprising:

a plurality of hardware components each configured to perform a vehicle function; and a non-transitory computer-readable medium comprising instructions stored thereon for implementing a method of controlling the hardware components when the instructions are executed by at least one processor, the method comprising:

providing an application layer comprising a plurality of virtual functional components, each virtual functional component representing a virtual function comprising one or more of the vehicle functions;

providing a software virtualization layer including a command registry including virtual commands for vehicle functions that are available to each virtual functional component to perform their corresponding virtual function and a data registry including state information, the state information including a current state of each of the virtual functional components and each of the physical nodes;

providing a hardware virtualization layer comprising mapping logic that maps virtual commands to hardware commands;

providing a hardware component layer comprising a plurality of physical nodes, each physical node being a virtual representation of a corresponding hardware component;

calling a virtual command from the command registry using a virtual functional component to perform a corresponding vehicle function, which is configured to at least partially complete the virtual function represented by the virtual functional component;

communicating the virtual command from the software virtualization layer to the hardware virtualization layer;

selecting one of the physical nodes corresponding to the received virtual command using the mapping logic using the hardware virtualization layer;

translating the received virtual command to a hardware command using the mapping logic using the hardware virtualization layer including modifying a sequence of one or more instructions of the received virtual command to a format that is suitable for execution by the one or more hardware components;

communicating the hardware command to a selected hardware component corresponding to the selected physical node using the hardware virtualization layer;

performing the vehicle function corresponding to the hardware command using the selected hardware component;

exposing the data registry to the plurality of virtual functional components;

outputting data elements from one or more of the hardware components, each data element representing a value of a parameter of the mobile vehicle;

communicating the data elements from the one or more hardware components to their corresponding physical nodes;

communicating the data elements received by the physical nodes to the software virtualization layer using the hardware virtualization layer; and updating the state information based on the data elements received from the hardware virtualization layer using the software virtualization layer.

7. The mobile vehicle of claim 6, wherein:

the hardware components include one or more hardware components selected from the group consisting of headlights, taillights, a blinker light, a parameter sensor, a temperature sensor, a pressure sensor, a heads-up display, a dashboard screen, a USB connector, a wireless communication adapter, a data communication adapter, a global positioning system (GPS) unit, a navigational unit, a user-input device, and an electronic control unit; and the virtual functions represented by the virtual functional components include one or more functions selected from the group consisting of turn the headlights on or off, turn the taillights on or off, turn the blinker light on or off, obtain a value of a parameter using the parameter sensor, obtain a temperature reading from the temperature sensor, obtain a pressure reading from the pressure sensor, display information on the heads-up display, display information on the dashboard screen, detect a connection to the USB connector, detect a connection to the wireless communication adapter, receive information using the wireless communication adapter or the data communication adapter, receive weather information using the wireless communication adapter or the data communication adapter, receive music data using the wireless communication adapter or the data communication adapter, receive position information from the GPS unit, receive navigational information from the navigational unit, receive user input through the user-input device, and perform functions using the electronic control unit.

8. The mobile vehicle of claim 7, wherein the data elements include one or more data elements selected from the group consisting of a pressure, a temperature, weather data, a cellular connection state, a GPS connection state, and a state of connection to an internet service.

9. The mobile vehicle of claim 7, wherein the mobile vehicle is selected from the group consisting of an automobile, an electric vehicle, an electric golf cart, a boat and a watercraft.

10. The mobile vehicle of claim 7, wherein the mobile vehicle is a motorcycle.

11. The mobile vehicle of claim 7, wherein the mobile vehicle is an electric bicycle.

12. The method of claim 5, wherein the data elements include one or more data elements selected from the group consisting of a pressure, a temperature, weather data, a cellular connection state, a GPS connection state, and a state of connection to an internet service.

13. The mobile vehicle of claim 6, including notifying the application layer to changes to the state information in the data registry using the software virtualization layer.

14. The mobile vehicle of claim 6, including translating the data elements using the hardware virtualization layer before communicating the data elements received by the physical nodes to the software virtualization layer.

15. The mobile vehicle of claim 6, including providing encryption and authentication services for communications between the application layer and the software virtualization layer, between the software virtualization layer and the hardware virtualization layer, and/or between the hardware virtualization layer and the physical nodes using a security layer of the vehicle computing architecture.

* * * * *